US012673403B2

(12) United States Patent
Ye et al.

(10) Patent No.: US 12,673,403 B2
(45) Date of Patent: Jul. 7, 2026

(54) FASTENER DRIVER

(71) Applicant: Nanjing Chervon Industry Co., Ltd., Nanjing (CN)

(72) Inventors: Junjie Ye, Nanjing (CN); Ran Lan, Nanjing (CN); Xiao Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 19/207,876

(22) Filed: May 14, 2025

(65) Prior Publication Data

US 2026/0183915 A1 Jul. 2, 2026

(30) Foreign Application Priority Data

Dec. 30, 2024 (CN) ........................ 202411979755.0
Dec. 30, 2024 (CN) ........................ 202411979759.9
Dec. 30, 2024 (CN) ........................ 202411979944.8

(51) Int. Cl.
*B25C 1/06* (2006.01)

(52) U.S. Cl.
CPC .................................... *B25C 1/06* (2013.01)

(58) Field of Classification Search
CPC .................................. B25C 1/06; B25C 5/15
See application file for complete search history.

(56) References Cited

U.S. PATENT DOCUMENTS

| | | | | |
|---|---|---|---|---|
| 12,521,860 | B2 * | 1/2026 | Xu | B25C 1/06 |
| 2007/0272422 | A1 * | 11/2007 | Coleman | B25C 1/06 173/1 |
| 2019/0321955 | A1 * | 10/2019 | Carrier | B25C 1/04 |
| 2022/0134522 | A1 * | 5/2022 | Zimmerman | B25C 1/008 |
| 2022/0234183 | A1 * | 7/2022 | Bierdeman | B25C 1/047 |
| 2022/0241948 | A1 * | 8/2022 | Baba | B25C 1/047 |
| 2023/0003264 | A1 * | 1/2023 | Schmittdiel | B25C 5/15 |
| 2025/0187159 | A1 * | 6/2025 | Wierzchon | B25C 1/047 |
| 2025/0229396 | A1 * | 7/2025 | Wechselberger | B25C 1/047 |
| 2025/0289107 | A1 * | 9/2025 | Leathrum | B25C 1/047 |
| 2025/0303542 | A1 * | 10/2025 | Liang | B25C 1/06 |

* cited by examiner

*Primary Examiner* — Thomas M Wittenschlaeger
(74) *Attorney, Agent, or Firm* — Greenberg Traurig, LLP

(57) ABSTRACT

A fastener driver includes a striking assembly including a striking member configured to strike a fastener; a drive assembly configured to drive the striking member, and an electric motor providing a driving force for at least the drive assembly. The drive assembly includes a drive wheel configured to engage with the striking member to drive the striking member to move along the extension direction of the striking member; a transmission box accommodating at least the drive wheel; and a fixed shaft non-rotatably mounted onto the transmission box to support the drive wheel.

15 Claims, 11 Drawing Sheets

FASTENER DRIVER

RELATED APPLICATION INFORMATION

This application claims the benefit under 35 U.S.C. § 119(a) of Chinese Patent Application No. 202411979755.0, filed on Dec. 30, 2024, Chinese Patent Application No. 202411979759.9, filed on Dec. 30, 2024, and Chinese Patent Application No. 202411979944.8, filed on Dec. 30, 2024, which applications are incorporated herein by reference in their entireties.

TECHNICAL FIELD

The present application relates to a power tool and, in particular, to a fastener driver.

BACKGROUND

In actual production and daily life, nails are sometimes needed to connect or fix objects. Manual knocking results in high labor intensity and low efficiency. Therefore, in the related art, a nail gun is usually used to perform the nailing action. The nail gun is a fastener driver for quickly driving nails into a working surface. A compressed air-driven nail gun has a compressed air-driven cylinder, and the thrust generated by the extension of a cylinder piston rod is used as the driving force acting on an impact part, thereby driving the nail into the working surface. A mechanical spring-loaded nail gun has an impact spring (compression spring). After the impact spring is compressed, the restoring force of the spring is used as the driving force acting on the impact part, thereby driving the nail into the working surface.

The compressed air-driven nail gun has a transmission box in which a drive wheel and an output shaft are provided. The drive wheel is fixedly sleeved on the output shaft, an electric motor drives the output shaft through a gearbox to drive the drive wheel to rotate, and a bearing is sleeved on the output shaft. Since the force exerted on the drive wheel is applied to the output shaft, for the structure supported by a single bearing, the output shaft is of a cantilever type in terms of the force. The possible consequences are described below.

1. The only remaining bearing is subjected to an excessive force, affecting the service life.

2. The output shaft is bent in a cantilever shape, causing the shaft pins of the drive wheel to be tilted at an angle relative to the firing pin teeth, resulting in abnormal wear of the firing pin teeth. Moreover, when approaching the top dead center, the firing pin is subjected to an additional vertical component force, affecting the service life of the firing pin.

3. The drive wheel wobbles at an angle, easily causing tooth jamming.

4. The wobbles of the drive wheel indirectly affect the gearbox, making the vibration of the gearbox more severe and worsening the working condition.

SUMMARY

A fastener driver includes a striking assembly, a drive assembly, and an electric motor. The striking assembly includes a striking member configured to strike a fastener. The drive assembly is configured to drive the striking member. The electric motor provides a driving force for at least the drive assembly. The drive assembly includes a drive wheel, a transmission box, and a fixed shaft. The drive wheel is configured to engage with the striking member to drive the striking member to move along the extension direction of the striking member. The transmission box accommodates at least the drive wheel. The fixed shaft is non-rotatably mounted onto the transmission box to support the drive wheel.

In some examples, the fixed shaft includes a first end fixed to the transmission box and a second end for mounting the drive wheel.

In some examples, the first end is configured to be an end facing away from the electric motor, and the second end is configured to be an end facing the electric motor.

In some examples, the transmission box includes an upper cover and a lower cover, and the first end is fixed on the upper cover.

In some examples, the drive assembly further includes a support bearing, where the support bearing is configured to support the drive wheel.

In some examples, the support bearing is sleeved on the second end.

In some examples, the support bearing is accommodated in a wheel cavity of the drive wheel.

In some examples, the drive wheel is disposed between the first end and the lower cover.

In some examples, the length of the first end is greater than or equal to 10 mm and less than or equal to 20 mm.

In some examples, a transmission assembly is further included, where the transmission assembly includes a drive shaft, and the drive wheel is rotatably connected to the drive shaft.

In some examples, the drive wheel is provided with a flat portion connectable to the drive shaft.

A fastener driver includes a striking assembly, a drive assembly, and an electric motor. The striking assembly includes a striking member configured to strike a fastener. The drive assembly is configured to drive the striking member. The electric motor provides a driving force for at least the drive assembly. The drive assembly includes a drive wheel, a support bearing, and a fixed shaft. The drive wheel is configured to engage with the striking member to drive the striking member to move along the extension direction of the striking member. The fixed shaft is used for mounting the support bearing. The support bearing and the drive wheel at least partially overlap axially.

In some examples, the ratio at which the support bearing and the drive wheel overlap axially is greater than or equal to 0.5.

In some examples, a transmission box is further included, where an end of the fixed shaft is fixedly mounted onto the transmission box, and the other end of the fixed shaft is accommodated in the transmission box.

In some examples, the support bearing is accommodated in a wheel cavity of the drive wheel.

In some examples, the support bearing is sleeved on the end of the fixed shaft accommodated in the transmission box.

A fastener driver includes a striking assembly, a drive assembly, and an electric motor. The striking assembly includes a striking member configured to strike a fastener. The drive assembly is configured to drive the striking member. The electric motor provides a driving force for at least the drive assembly. The drive assembly includes a drive wheel and a fixed shaft. The drive wheel has multiple circumferentially arranged engagement positions, where the multiple engagement positions engage with the striking member so that the striking member is driven to move along the extension direction of the striking member. The fixed shaft has a first end for fixedly mounting the fixed shaft. In a direction parallel to the fixed shaft, the minimum distance h1 from the geometric center plane of the multiple engagement positions to the first end is greater than or equal to 3.5 mm.

In some examples, a transmission box is further included, where the first end of the fixed shaft is fixedly mounted onto the transmission box.

In some examples, the transmission box includes an upper cover and a lower cover, the first end is fixed on the upper cover, and the drive wheel is accommodated in a box body.

In some examples, the drive assembly further includes a support bearing, where the support bearing is sleeved on a second end of the fixed shaft.

In some examples, the support bearing is accommodated in a wheel cavity of the drive wheel.

In some examples, the minimum distance h2 from a lower end surface of the support bearing to the first end is greater than or equal to 10 mm.

In some examples, h1 is less than or equal to h2.

In some examples, a transmission assembly is further included, where the transmission assembly includes a drive shaft, and the drive wheel is rotatably connected to the drive shaft.

In some examples, the drive wheel is provided with a flat portion connectable to the drive shaft.

DETAILED DESCRIPTION

Figure 1:
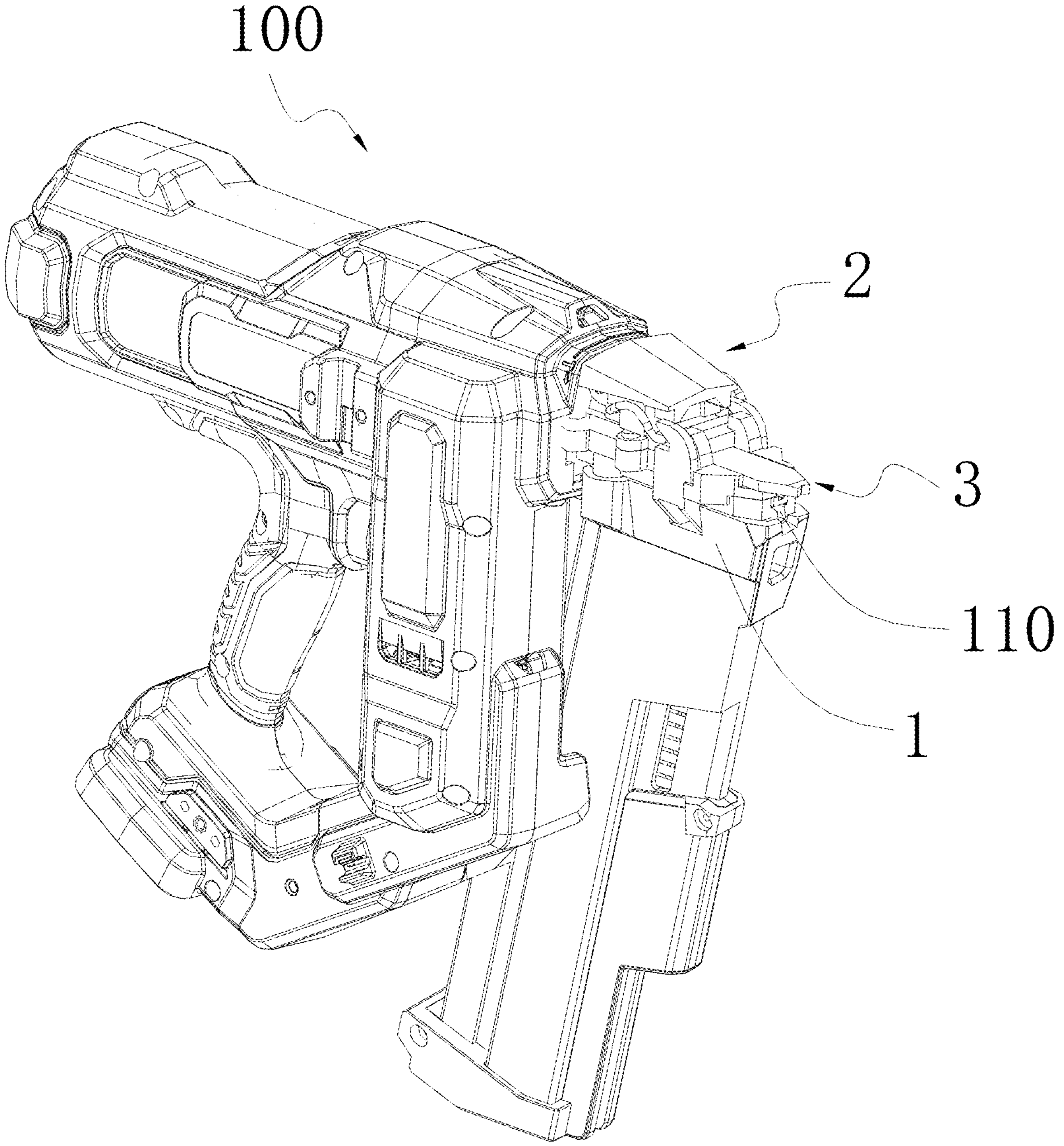
FIG. 1 is a schematic view of a fastener driver.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings.

In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, “substantially” when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms “up”, “down”, “left”, “right”, “front”, and “rear” and other directional words are described based on the orientation or positional relationship shown in the drawings, and should not be understood as limitations to the examples of this application. In addition, in this context, it also needs to be understood that when it is mentioned that an element is connected “above” or “under”

another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

The handheld power tool plays a very important role in daily production and life. The handheld power tool includes, but is not limited to, an electric hand drill, an impact drill, an impact wrench, an impact screwdriver, an angle grinder, a nail gun, and a fastener driver. The electric hand drill and the impact drill may be equipped with drill bits of different diameters to drill holes in objects. The impact wrench is used for tightening bolts and nuts. The impact screwdriver is usually used for loosening or tightening screws. The angle grinder can grind and cut objects. The handheld power tool can improve working efficiency and reduce labor intensity.

FIG. 1 shows a fastener driver in an example of the present application. The fastener driver is used for driving a fastener into a working surface. For example, the fastener is a nail, and the nail may be a straight nail or a U-shaped nail. The fastener driver quickly drives the fastener into the working surface, thereby fixing the working surface to the platform on the back side of the working surface. In this example, the fastener driver is, for example, a nail gun.

Optionally, the fastener driver includes a mechanical spring-loaded nail gun that utilizes the force of the compressed coil spring as an impact force (for example, a driving force). Optionally, the fastener driver is a cylinder-type nail gun that compresses the gas in the cylinder so that the compressed gas pushes out a firing assembly to perform the nailing action.

The fastener driver is powered by a rechargeable battery set. In some examples, the battery set is a battery pack, and the battery pack mates with a corresponding power circuit to supply power to the fastener driver. It is to be understood by those skilled in the art that in other examples, the fastener driver may be powered by other power supply devices. For example, the power supply may be the alternating current wire connected to mains power, or the power supply may be other connection cables that can be connected to the power supply device. The corresponding components in the fastener driver are powered through mains power or other power supply devices in conjunction with corresponding rectifier, filter, and voltage regulator circuits. The battery pack is used below instead of the power supply, but it is not regarded as a limitation to the present application.

As shown in FIGS. 1 to 14, the present application provides a fastener driver 100. The fastener driver 100 includes a nail base 1, a nail cover assembly 2, a trigger assembly 3, and an operable adjustment assembly 4.

The nail base 1 is mounted at a nail outlet of a magazine assembly of the fastener driver 100. A nail outlet channel 110 is formed between the nail cover assembly 2 and the nail base 1. The trigger assembly 3 includes a trigger lever 31, and the trigger lever 31 is configured to be movable relative to the nail base 1 or the nail cover assembly 2 along the extension direction of the trigger lever 31. The operable adjustment assembly 4 is configured to adjust the position of the trigger lever 31 relative to the nail base 1 or the nail cover assembly 2. The trigger lever 31 and the adjustment assembly 4 are configured to be capable of pivoting relative to the nail base 1 along with the nail cover assembly 2.

When the fastener driver 100 is used, the position of the trigger lever 31 relative to the nail base 1 or the nail cover assembly 2 can be adjusted by the operable adjustment assembly 4. After the position of the trigger lever 31 is adjusted, nailing can be performed. When the nails are stuck during nailing, the nail cover assembly 2 needs to be rotated relative to the nail base 1 and opened to completely expose the nails stuck in the nail outlet channel 110 so that the stuck nails can be quickly removed, thereby ensuring the efficient of removing the stuck nails and facilitating the operation.

Figure 5:
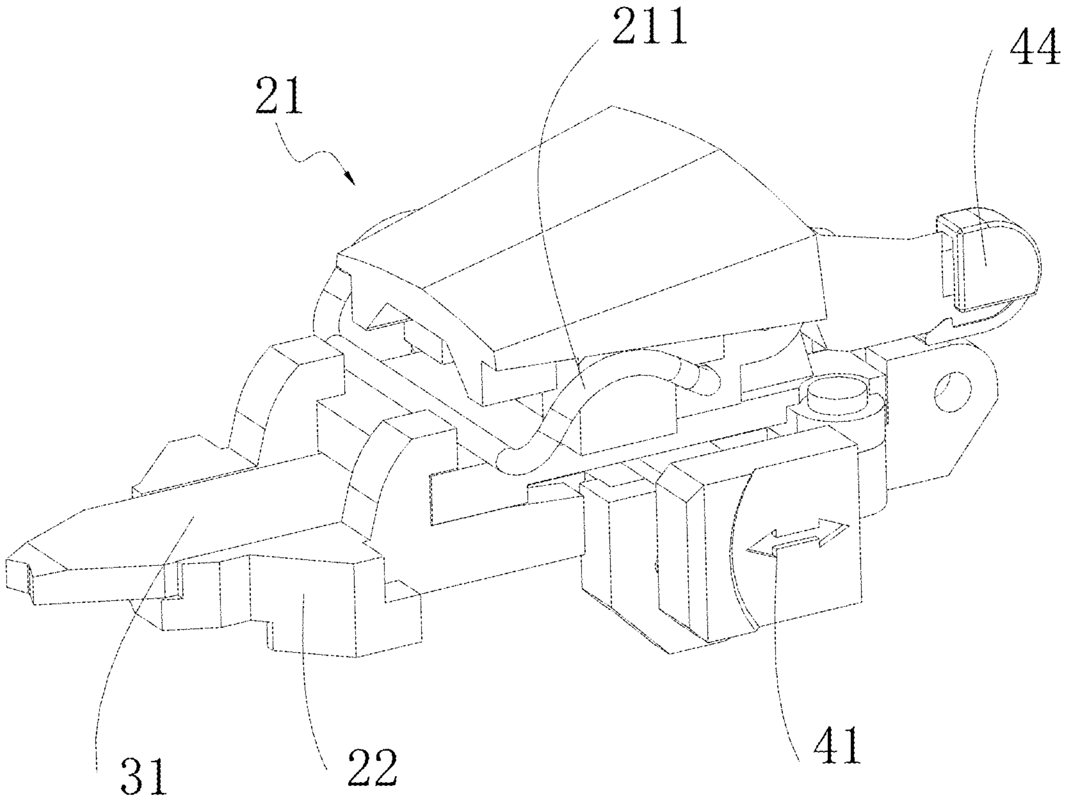
FIG. 5 is a schematic view of a nail cover assembly and a trigger assembly in a fastener driver.
Figure 6:
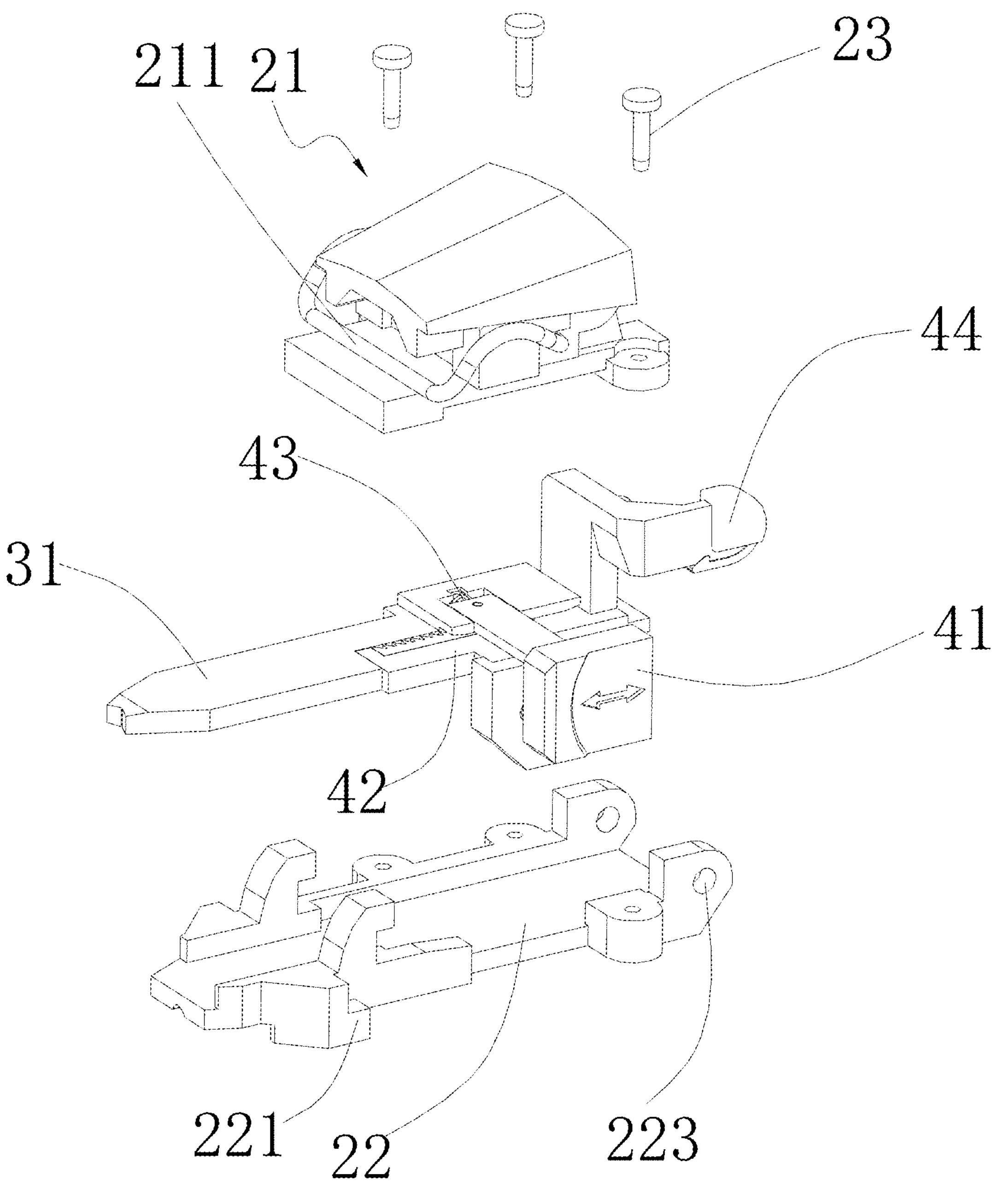
FIG. 6 is an exploded view of a nail cover assembly and an adjustment assembly in a fastener driver.

As shown in FIGS. 5 and 6, in some examples, the nail cover assembly 2 includes an upper cover assembly 21 and a lower cover 22 connected to each other, and the projection of the adjustment assembly 4 on the horizontal plane at least partially falls within the range of the projection of the upper cover assembly 21 on the horizontal plane. In the preceding manner, the space occupied by the adjustment assembly 4 and the upper cover assembly 21 can be reduced, thereby ensuring the compactness of the fastener driver 100 and facilitating the usage of the fastener driver 100 in a narrow space. The adjustment assembly 4 may be integrated between the upper cover assembly 21 and the lower cover 22, thereby further improving the integration degree between the adjustment assembly 4 and the nail cover assembly 2 and facilitating the arrangement of the adjustment assembly 4 on the nail cover assembly 2. Moreover, the adjustment assembly 4 can be protected by the upper cover assembly 21 and the lower cover 22.

Figure 2:
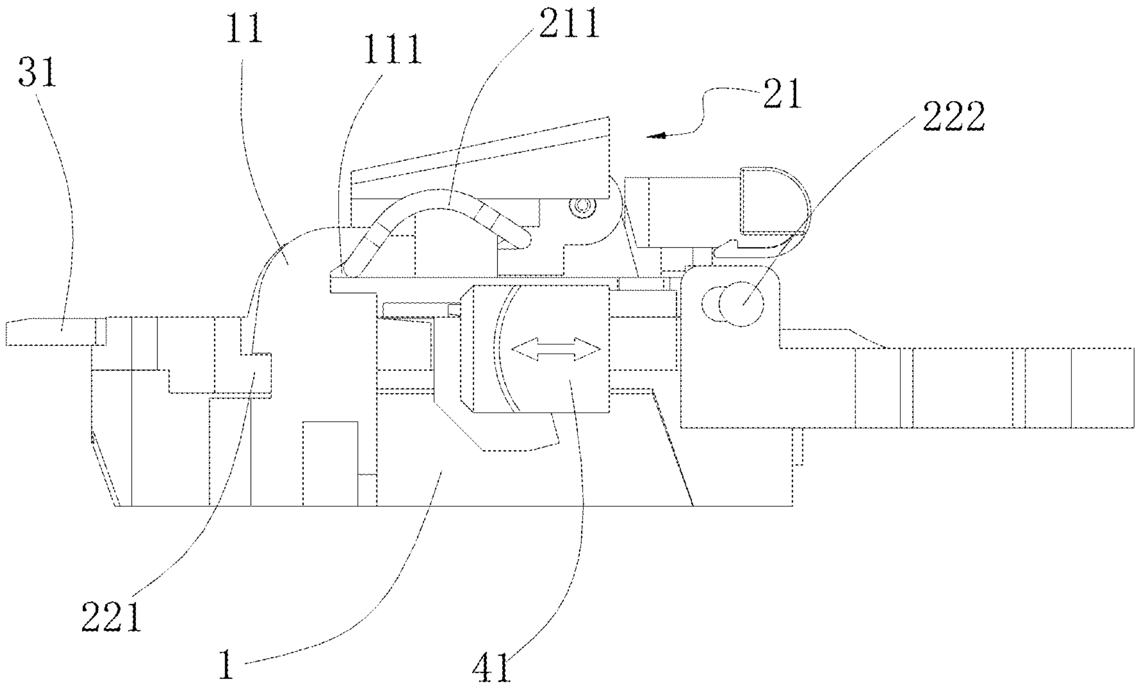
FIG. 2 is a schematic view illustrating that a nail cover assembly and a nail base in a fastener driver are locked.
Figure 3:
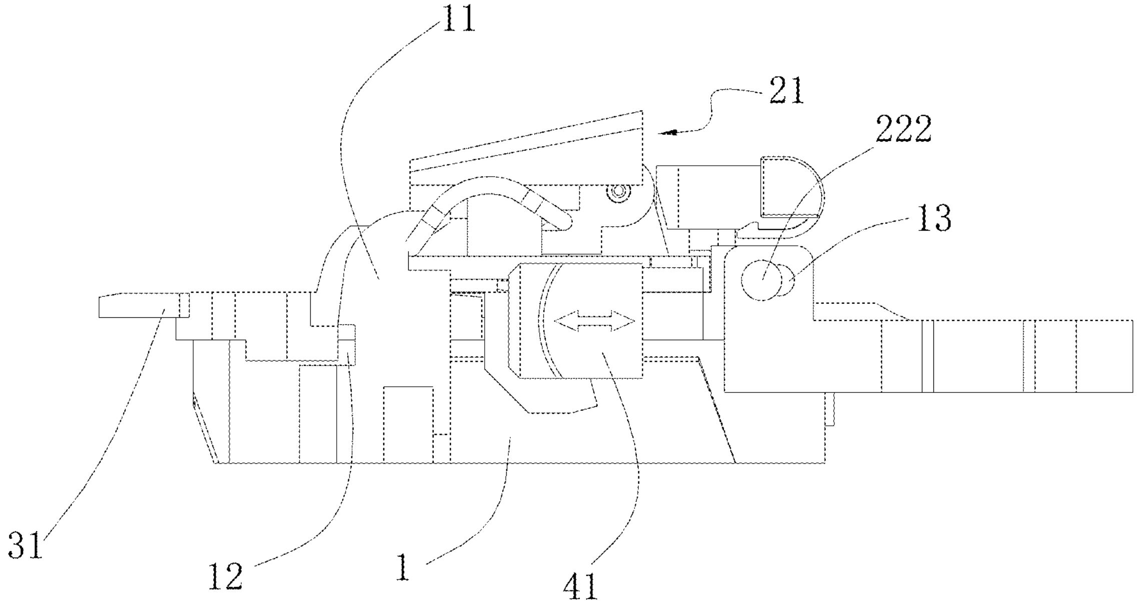
FIG. 3 is a schematic view illustrating that a nail cover assembly and a nail base in a fastener driver are unlocked.
Figure 4:
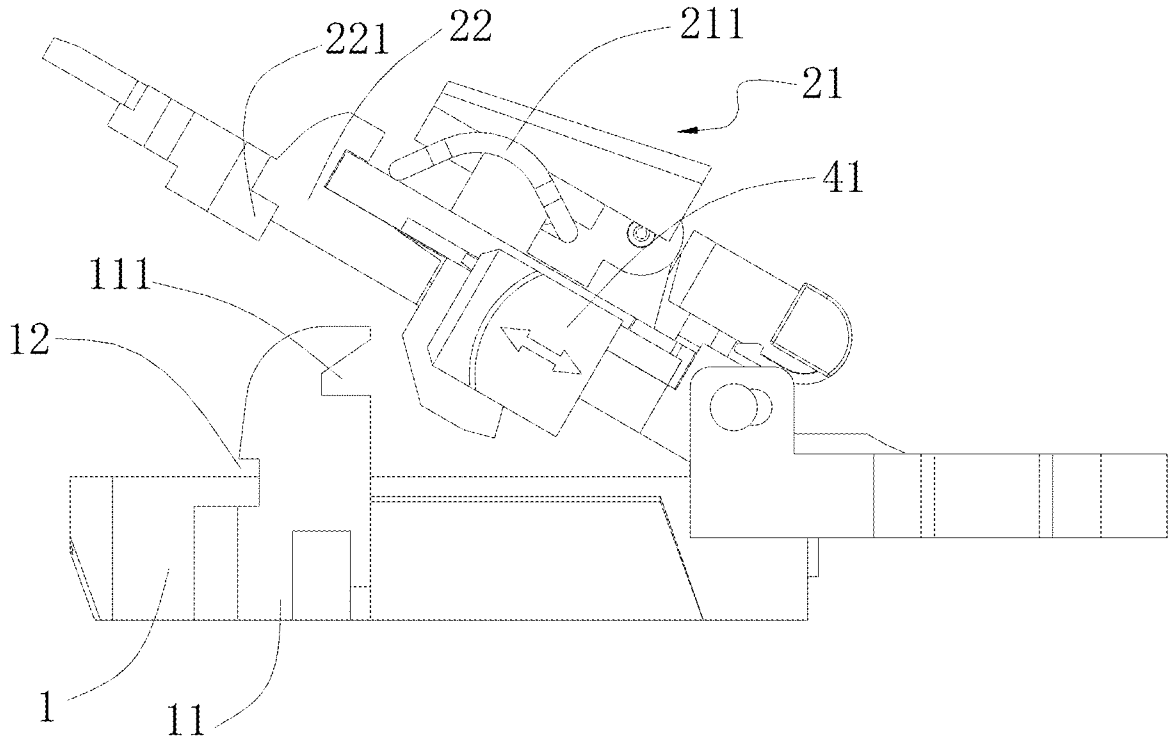
FIG. 4 is a schematic view illustrating that a nail cover assembly pivots relative to a nail base in a fastener driver.

As shown in FIGS. 2 to 4, in some examples, the upper cover assembly 21 includes a locking member 211, and the locking member 211 is configured to mate with the nail base 1 to lock the nail cover assembly 2 onto the nail base 1. By providing the locking member 211, when the fastener driver 100 is working, the locking member 211 can lock the nail cover assembly 2 and the nail base 1, thereby ensuring that the nail cover assembly 2 does not move relative to the nail base 1 during the nailing process. Connecting plates 11 are spaced apart on the nail base 1, and the connecting plates 11 extend toward the upper cover assembly 21. A snap groove 111 is provided on the connecting plate 11. The locking member 211 is U-shaped. The locking member 211 is rotatably disposed on a cover plate of the upper cover assembly 21 through an opening. The locking member 211 can engage with the snap grooves 111, thereby locking the nail cover assembly 2 and the nail base. During unlocking, the locking member 211 disengages from the snap grooves 111 so that the nail cover assembly 2 can pivot.

As shown in FIG. 6, in some examples, the upper cover assembly 21 and the lower cover 22 are fixedly connected by screws 23, fixing pins, or snap fasteners. The upper cover assembly 21 and the lower cover 22 are mounted in the preceding manner, thereby facilitating the quick installation and disassembly of the upper cover assembly 21 and the lower cover 22 assembly.

As shown in FIGS. 2 to 4, in some examples, a first interlocking portion 221 is formed on the lower cover 22, and a second interlocking portion 12 is formed on the nail base 1. When the nail cover assembly 2 is locked onto the nail base 1 through the locking member 211, the second interlocking portions 12 can lock the lower cover 22. The first interlocking portions 221 mate with the second interlocking portions 12 so that the lower cover 22 is fixed and locked onto the nail base 1, thereby ensuring that the nail cover assembly 2 is stably connected to the nail base 1 and preventing the nail cover assembly 2 from separating from the nail base 1 when the fastener driver 100 performs the nailing action. The first interlocking portions 221 are protrusions, and the second interlocking portions 12 are locking grooves. When the first interlocking portion 221 mates with the second interlocking portion 12, the first interlocking portion 221 is located in the locking groove. When the nail cover assembly 2 needs to pivot relative to the nail base 1, the first interlocking portions 221 can separate from the second interlocking portions 12 by moving the lower cover 22 in the nailing direction. The first interlocking portions 221 mate with the second interlocking portions 12 so that the nail cover assembly 2 and the nail base 1 can both withstand a certain impact force during the nailing process, thereby reducing the force exerted on the locking member 211, improving the force state of the locking member 211, and thus extending the service life of the locking member 211.

Figure 7:
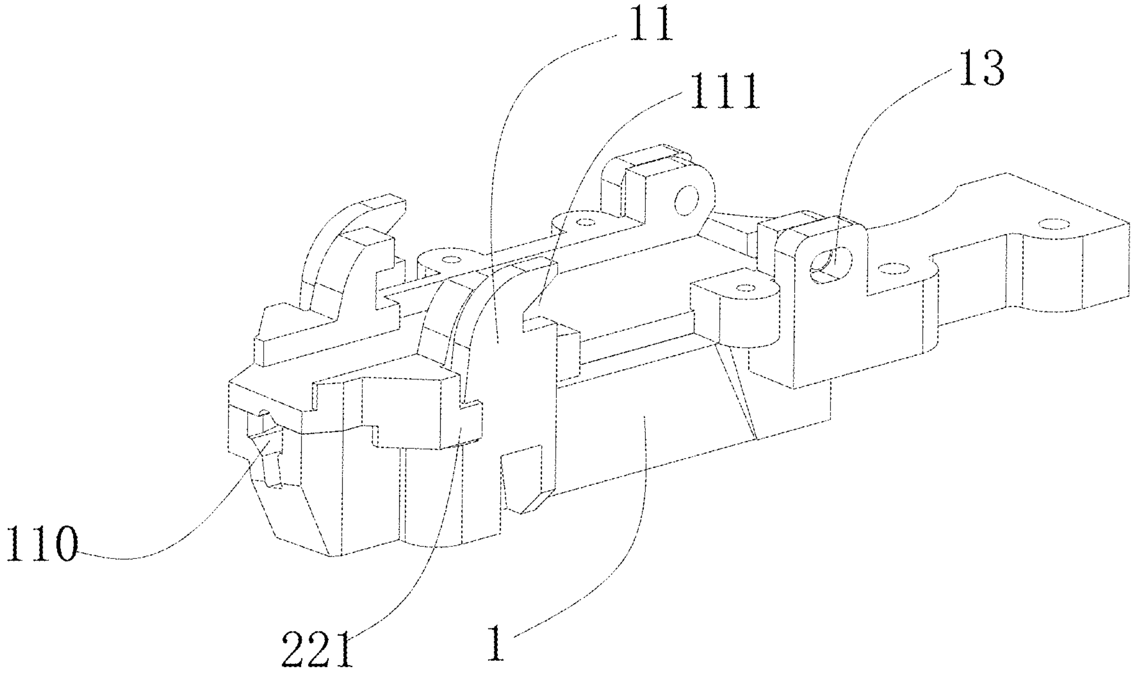
FIG. 7 is a schematic view illustrating that a lower cover and a nail base in a fastener driver are locked.
Figure 8:
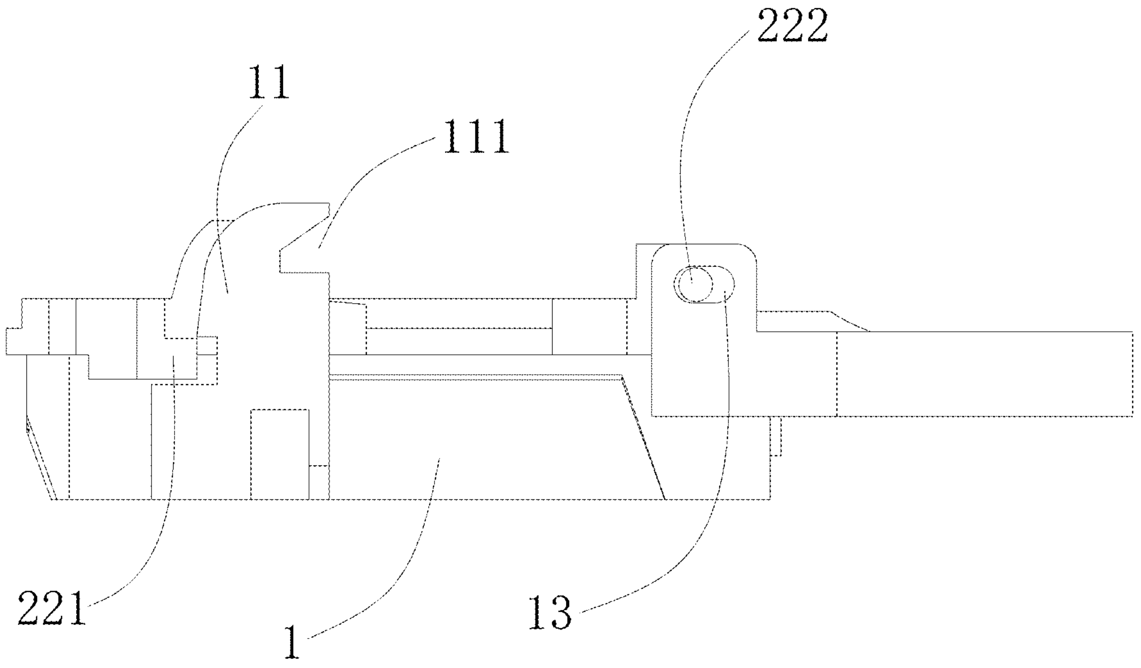
FIG. 8 is a schematic view illustrating that a lower cover and a nail base in a fastener driver are unlocked.

As shown in FIGS. 6 to 8, in some examples, first mounting holes 13 are provided on the nail base 1 and can mate with second mounting holes 223 on the lower cover 22, thereby mounting the nail cover assembly 2 onto the nail base 1, and the first mounting holes 13 on the nail base 1 are configured to be waist-shaped holes. During the assembly process of the nail base 1 and the lower cover 22, a pin shaft 222 penetrates the first mounting holes 13 and the second mounting holes 223; the pin shaft 222 is movable in the first mounting holes 13 to achieve the locking and separation of the first interlocking portions 221 and the second interlocking portions 12; and the pin shaft 222 is rotatable relative to the first mounting holes 13 so that after the nail base 1 separates from the nail cover assembly 2, the nail cover assembly 2 can pivot relative to the nail base 1 through the pin shaft 222, thereby facilitating the subsequent removal of the stuck nails. The pin shaft 222 may be fixed on the lower cover 22 or provided separately, and no further restrictions are imposed here.

As shown in FIG. 6, in some examples, the adjustment assembly 4 includes a detection element 44, and the detection element 44 is configured to be movable along with the trigger lever 31 and be detected when moving to a preset position to trigger a working signal. By providing the detection element 44, a safety protection function can be provided when the fastener driver 100 is used. Only when the trigger lever 31 is detected to move to the preset position, the working signal can be outputted, thereby avoiding the erroneous operation. The detection element 44 may be made of ferromagnetic materials such as magnetic steel. After moving to the preset position, the detection element 44 is recognized by the safety Hall element on the fastener driver 100, thereby sending a nailing signal. In other examples, a collision sensor or a proximity sensor may be used as the detection element 44, and no further restrictions are imposed here.

As shown in FIGS. 9 to 13, in some examples, the adjustment assembly 4 includes an adjustment member 41, a movable member 43, and a fixed member 42. The adjustment member 41 is configured to be operable by the user to adjust the strike depth. The movable member 43 is connected to the adjustment member 41. The movable member 43 is movable driven by the adjustment member 41. The fixed member 42 can mate with the movable member 43 to lock the trigger lever 31. When the strike depth of the fastener driver 100 needs to be adjusted, the adjustment member 41 is operated to drive the movable member 43 to move such that the movable member 43 is separated from the fixed member 42, and the trigger lever 31 is unlocked, thereby adjusting the position of the trigger lever 31 relative to the nail base 1 or the nail cover assembly 2. After the adjustment, the adjustment member 41 is operated such that the movable member 43 mates with the fixed member 42 to lock the position of the trigger lever 31. In the preceding manner, the relative position of the trigger lever 31 can be adjusted quickly, thereby flexibly satisfying the requirements for the strike depth in different scenarios.

Figure 10:
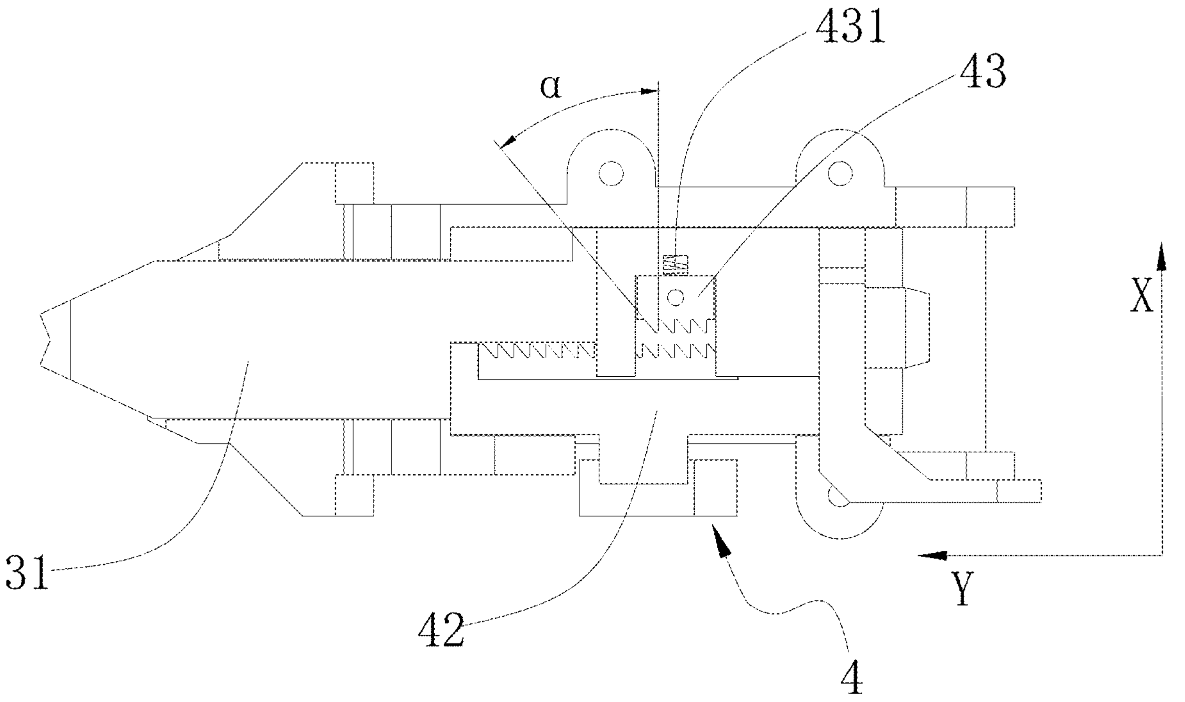
FIG. 10 is a schematic view illustrating that a movable member and a fixed member in a fastener driver are decoupled.
Figure 11:
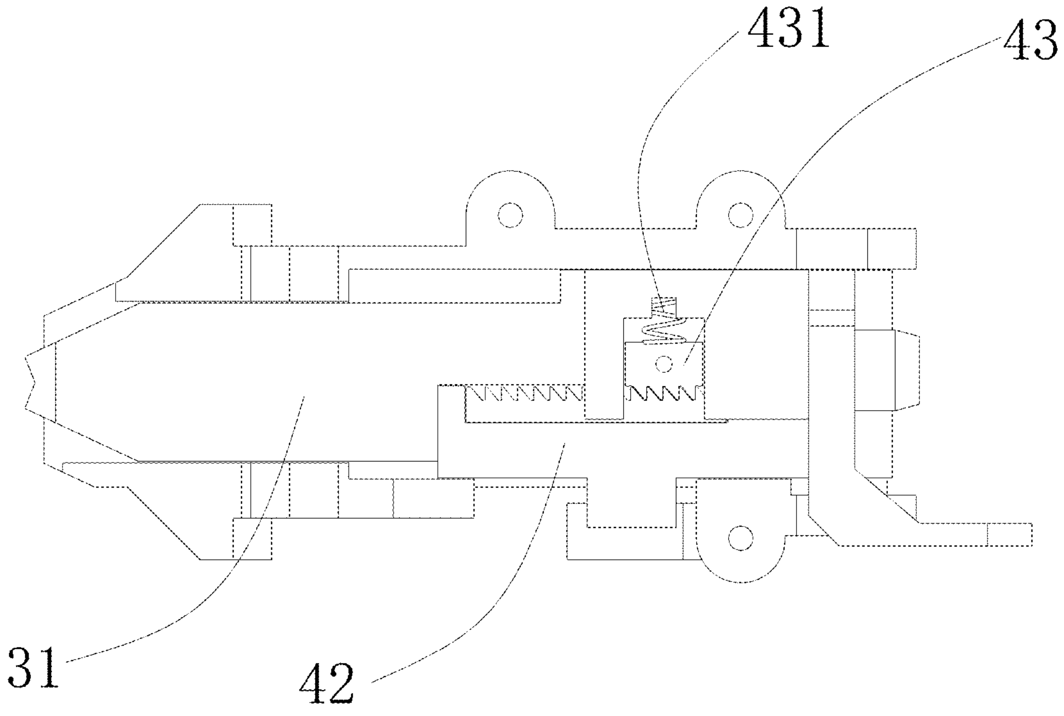
FIG. 11 is a schematic view of a fastener driver at the maximum strike depth.
Figure 12:
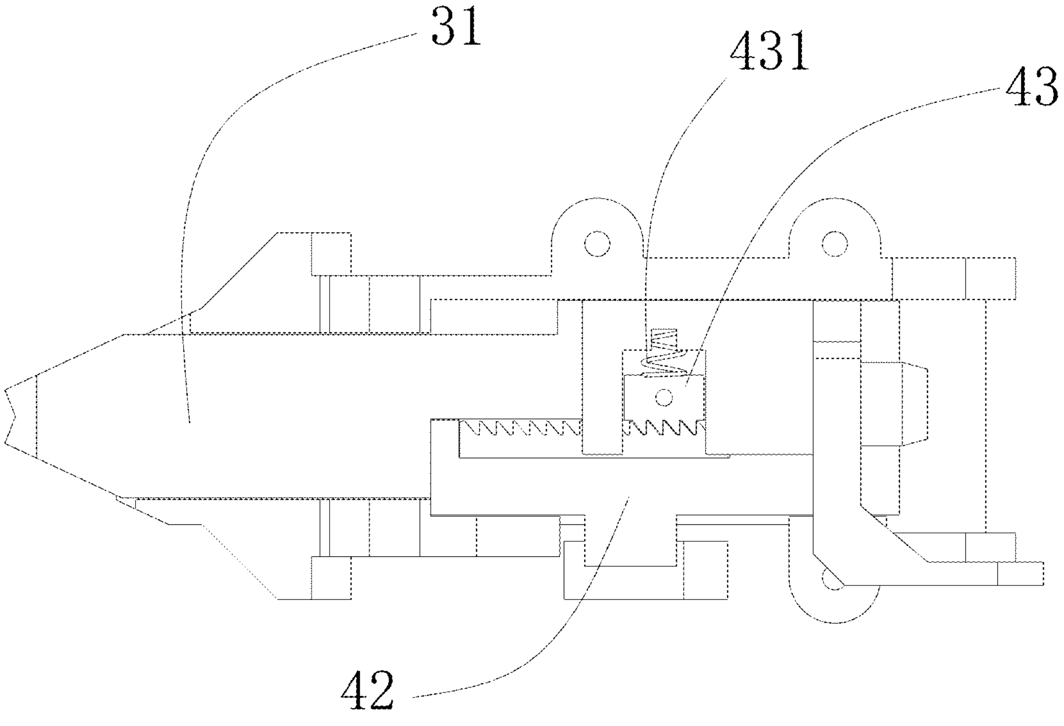
FIG. 12 is a schematic view of a fastener driver at the intermediate strike depth.
Figure 13:
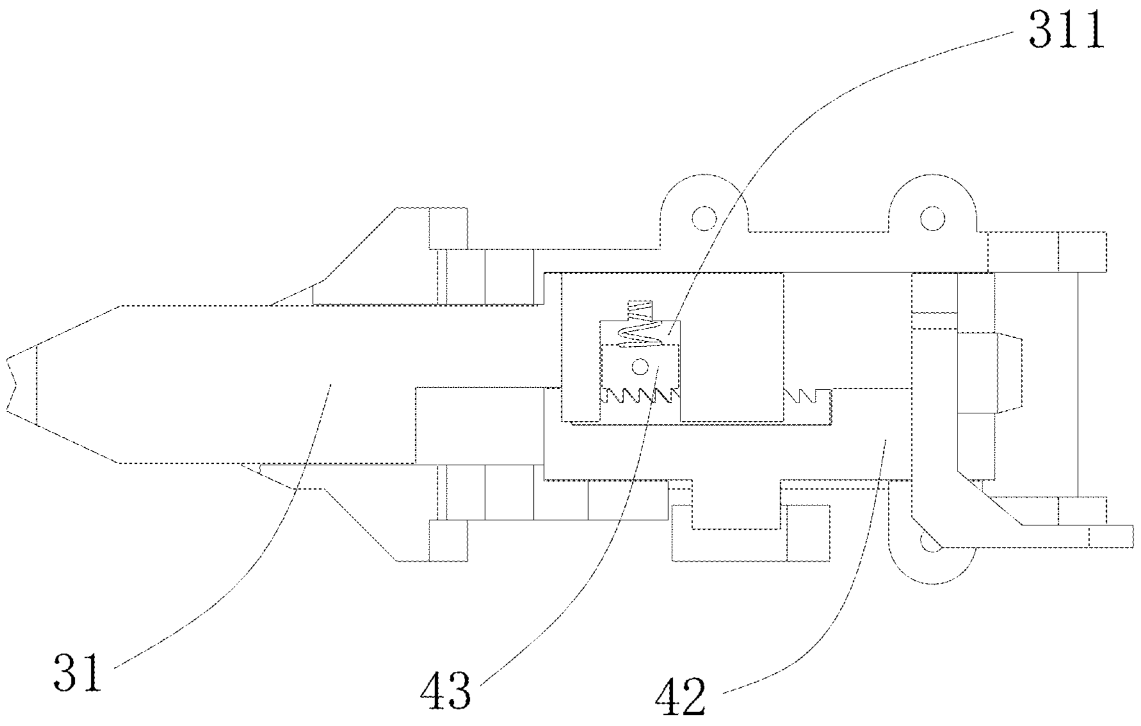
FIG. 13 is a schematic view of a fastener driver at the minimum strike depth.
Figure 14:
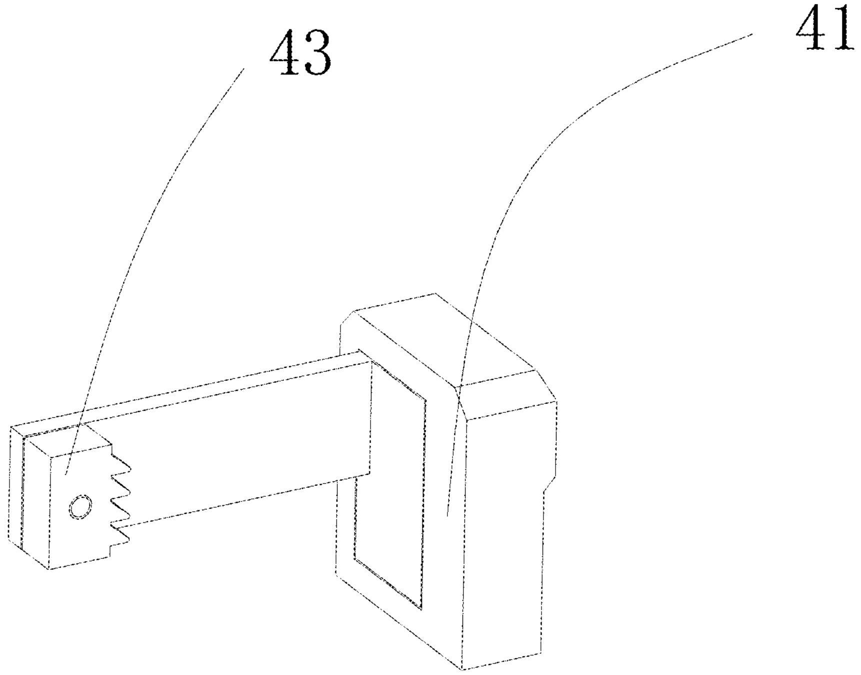
FIG. 14 is a schematic view of an adjustment member and a movable member in a fastener driver.

As shown in FIG. 10, in some examples, the adjustment member 41 and the fixed member 42 can be unlocked when the adjustment member 41 moves along the first direction, and the adjustment member 41 can drive the trigger lever 31 to move when moving along the second direction. The first direction is the X direction, and the second direction is the Y direction. When the relative position of the trigger lever 31 is adjusted, the adjustment member 41 is moved along the first direction to drive the movable member 43 to move along the first direction so that the movable member 43 is separated from the fixed member 42, and then the trigger lever 31 can be moved along the second direction, thereby adjusting the relative position of the trigger lever 31. The unlocking and the relative position adjustment of the trigger lever 31 can be achieved through the adjustment member 41, thereby ensuring a simple structure and facilitating the operation. In some examples, the first direction is basically perpendicular to the second direction. In the preceding manner, the operator only needs to press the movable member 43 along the first direction to unlock the movable member 43 and the fixed member 42 and then push the adjustment member 41 along the second direction to adjust the position of the trigger lever 31, thereby facilitating the operation by the operator.

As shown in FIG. 1, the present application further provides the fastener driver 100, and the fastener driver 100 includes the nail base 1, the nail cover assembly 2, the trigger assembly 3, and the operable adjustment assembly 4.

As shown in FIGS. 1 to 3, the nail base 1 is mounted at the nail outlet of the magazine assembly. The nail cover assembly 2 includes the upper cover assembly 21 and the lower cover 22, and the nail cover assembly 2 can be locked onto the nail base 1. The nail outlet channel 110 is formed on the opposite surface of the nail base 1 and the lower cover 22. When the nail cover assembly 2 is unlocked from the nail base 1, the nail outlet channel 110 can be exposed. The trigger assembly 3 is disposed between the upper cover assembly 21 and the lower cover 22. The trigger assembly 3 includes the trigger lever 31. The trigger lever 31 is configured to be movable relative to the nail base 1 or the nail cover assembly 2 along the extension direction of the trigger lever 31. The operable adjustment assembly 4 is disposed between the upper cover assembly 21 and the lower cover 22 and is configured to be capable of adjusting the strike depth of the fastener driver 100.

The adjustment assembly 4 and the trigger assembly 3 are integrated on the nail cover assembly 2, thereby facilitating the arrangement and improving the compactness of the fastener driver 100. Moreover, when the nail cover assembly 2 is unlocked from the nail base 1, the nail outlet channel 110 can be exposed, thereby facilitating the removal of the stuck nails. In the preceding manner, the nail cover assembly 2 can integrate the trigger function and the depth adjustment function and can also achieve quick nail removal.

As shown in FIG. 1, the present application further provides the fastener driver 100, and the fastener driver 100 includes the nail base 1, the nail cover assembly 2, a striking assembly, the trigger assembly 3, and the operable adjustment assembly 4.

As shown in FIGS. 9 to 13, the nail base 1 is mounted at the nail outlet of the magazine assembly. A nail outlet channel 110 is formed between the nail cover assembly 2 and the nail base 1. The striking assembly includes a striking member configured to strike a fastener, the fastener is a nail, and the striking member is a firing pin. The trigger assembly 3 includes the trigger lever 31 configured to be movable along the extension direction of the trigger lever 31 to trigger a working signal. The operable adjustment assembly 4 is configured to adjust the position of the trigger lever 31 relative to the nail base 1 or the nail cover assembly 2. The adjustment assembly 4 includes the fixed member 42 and the adjustment member 41. The fixed member 42 can be interlocked with the trigger lever 31. The adjustment member 41 is configured to be operable by the user to decouple the trigger lever 31 from the fixed member 42 or couple the trigger lever 31 to the fixed member 42. When the adjustment member 41 is operated in the first operating manner, the trigger lever 31 and the fixed member 42 are decoupled; and when the adjustment member 41 is operated in the second operating manner, the trigger lever 31 can be driven to move, thereby adjusting the relative position.

When the nailing depth of the fastener driver 100 needs to be adjusted, the adjustment member 41 is operated in the first operating manner to decouple the trigger lever 31 from the fixed member 42, and then the adjustment member 41 is operated in the second operating manner to drive the trigger lever 31 to move, thereby adjusting the position of the trigger lever 31 relative to the nail base 1 or the nail cover assembly 2. After the adjustment is completed, the adjustment member 41 is operated to couple the trigger lever 31 to the fixed member 42, thereby locking the position of the trigger lever 31. When the position of the trigger lever 31 is adjusted, the adjustment member 41 only needs to be operated in the first operating manner and the second operating manner, thereby facilitating the quick operation. Moreover, the trigger lever 31 is used to trigger the working signal, thereby playing a role of safety protection when the fastener driver 100 is working. Only when the trigger lever 31 is detected to move to the preset position, the working signal can be outputted, thereby avoiding the erroneous operation.

In some examples, at least the operating direction of the first operating manner is different from the operating direction of the second operating manner. By distinguishing the direction of the first operating manner from the direction of the second operating manner, it is convenient for the operator to effectively master the operating manners so that the operator can skillfully adjust the strike depth.

As shown in FIGS. 9 to 14, in some examples, the adjustment assembly 4 further includes the movable member 43 connected to the adjustment member 41, and the movable member 43 can be driven by the adjustment member 41 to move to be decoupled from the fixed member 42. The movable member 43 mates with the fixed member 42 to lock the trigger lever 31. When the movable member 43 needs to be decoupled from the fixed member 42, the movable member 43 and the fixed member 42 can be decoupled by operating the adjustment member 41. The movable member 43 and the adjustment member 41 may be designed as an integrated structure for ease of manufacture and installation, or the movable member 43 and the adjustment member 41 may be designed as split structures, and no further restrictions are imposed here.

As shown in FIG. 10, in some examples, when the adjustment member 41 is operated in the first operating manner, the movable member 43 moves along a direction perpendicular to the extension direction of the trigger lever 31. By operating the adjustment member 41 in the preceding manner, the movable member 43 can be decoupled from the fixed member 42, thereby unlocking the trigger lever 31. The operator may adjust the position of the trigger lever 31 relative to the nail base 1 according to actual requirements.

In some examples, when the adjustment member 41 is operated in the second operating manner, the movable member 43 can drive the trigger lever 31 to move along the extension direction of the trigger lever 31. After the trigger lever 31 is unlocked, the adjustment member 41 is operated along the extension direction of the trigger lever 31 to adjust the relative position between the trigger lever 31 and the nail base 1.

Figure 9:
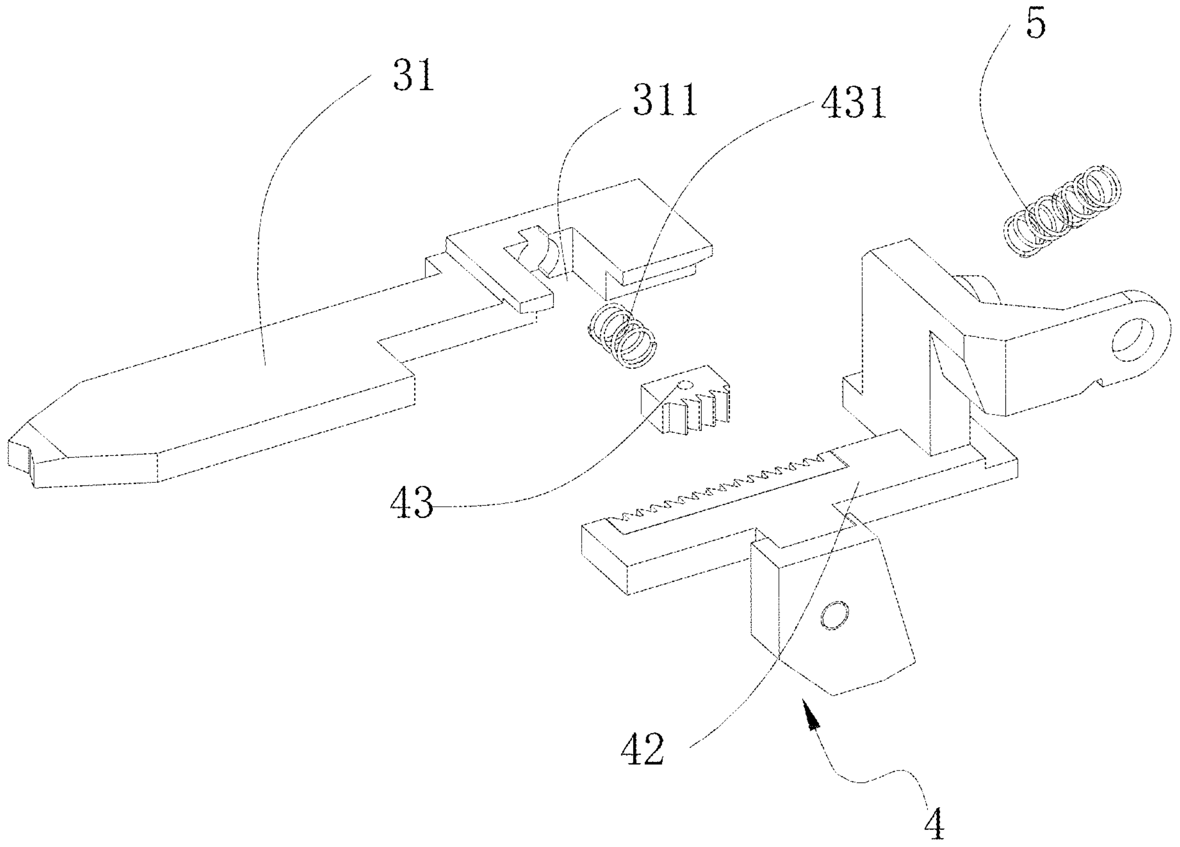
FIG. 9 is an exploded view of an adjustment assembly in a fastener driver.

As shown in FIG. 9, in some examples, the trigger lever 31 is provided with an accommodation portion 311 to accommodate the movable member 43. By providing the accommodation portion 311 for accommodating the movable member 43, the compact structure of the trigger lever 31 can be ensured, and the movable member 43 and the trigger lever 31 can be integrated together so that when the movable member 43 is coupled to the fixed member 42, the movement of the trigger lever 31 can be limited. The adjustment member 41 is operated in the first operating manner to decouple the movable member 43 from the fixed member 42, and then the adjustment member 41 is operated in the second operating manner to drive the movable member 43 to move so that the movable member 43 can drive the trigger lever 31 to move, thereby adjusting the position of the trigger lever 31.

As shown in FIGS. 9 to 12, in some examples, a first elastic member 431 is disposed in the accommodation portion 311, and the first elastic member 431 is configured to be in a compressed state when the adjustment member 41 is operated and to reset the interlocking between the movable member 43 and the fixed member 42 when the adjustment member 41 is not operated. The first elastic member 431 is a compression spring disposed in the accommodation portion 311, an end of the first elastic member 431 abuts against the bottom of the accommodation portion 311, and the other end of the first elastic member 431 abuts against the movable member 43. When the adjustment member 41 is not operated, the movable member 43 is interlocked with the fixed member 42 under the action of the first elastic member 431. After the position of the trigger lever 31 is adjusted in the first operating manner and the second operating manner, the first elastic member 431 can push the movable member 43 to be reset to the coupling state with the fixed member 42 under the action of the elastic restoring force.

As shown in FIG. 6, in some examples, the adjustment assembly 4 further includes the detection element 44, and the detection element 44 is configured to be detectable in the case where the trigger lever 31 abuts against a workpiece to trigger a working signal. The detection element 44 may be made of ferromagnetic materials such as magnetic steel. In the case where the trigger lever 31 abuts against the workpiece, the detection element 44 moving to the preset position is recognized by the safety Hall element on the fastener driver 100, thereby sending a nailing signal. In other examples, a collision sensor or a proximity sensor may be used as the detection element 44, and no further restrictions are imposed here.

As shown in FIGS. 9 to 13, in some examples, the movable member 43 and the fixed member 42 are configured to be interlocked by ratchet teeth, and the angle of inclination a of the ratchet teeth is greater than or equal to 75° and less than or equal to 105°. The angle of inclination of the ratchet teeth may be 80°, 85°, 90°, 95° . . . . The ratchet tooth shape has a special angle design. In the normal working condition, the manual thrust is not enough to decouple the movable member 43 from the fixed member 42. However, when the fastener driver 100 falls or is subjected to a larger impact, the movable member 43 may slip relative to the fixed member 42 to absorb the impact force, thereby effectively protecting the trigger assembly 3 and the adjustment assembly 4. Moreover, the movable member 43 and the fixed member 42 can be quickly separated or engaged. The movable member 43 can drive the trigger lever 31 to move. When the strike depth is adjusted, the movable member 43 can move in a small range perpendicular to the trigger lever 31 to achieve quick separated or engaged with the fixed member 42, and the movable member 43 is coupled to the fixed member 42 during nailing. When the movable member 43 is decoupled from the fixed member 42, the position of the trigger lever 31 can be quickly adjusted according to the strike depth. Compared with the structure in which the trigger lever 31 is adjusted by the leadscrew and the nut, the manner in which the movable member 43 and the fixed member 42 are interlocked through the ratchet teeth makes the adjustment of the trigger lever 31 quicker.

As shown in FIG. 9, in some examples, the fastener driver 100 further includes a second elastic member 5 disposed at the rear end of the adjustment assembly 4 and configured to reset the trigger lever 31 after the trigger lever 31 is triggered. The second elastic member 5 is a compression spring, and an end of the second elastic member 5 abuts against an end of the fixed member 42 facing away from the trigger lever 31. The detection element 44 is fixedly disposed on the fixed member. When the trigger lever 31 is in contact with the workpiece, the trigger lever 31 drives the fixed member 42, through the movable member 43, to move away from the workpiece, thereby compressing the second elastic member 5. When moving to the preset position, the detection element 44 is recognized by the safety Hall element on the fastener driver 100, thereby sending a nailing signal. After nailing is completed and the trigger lever 31 is separated from the workpiece, the second elastic member 5 can push the fixed member 42, thereby pushing the trigger lever 31 to reset the trigger lever 31.

Figure 15:
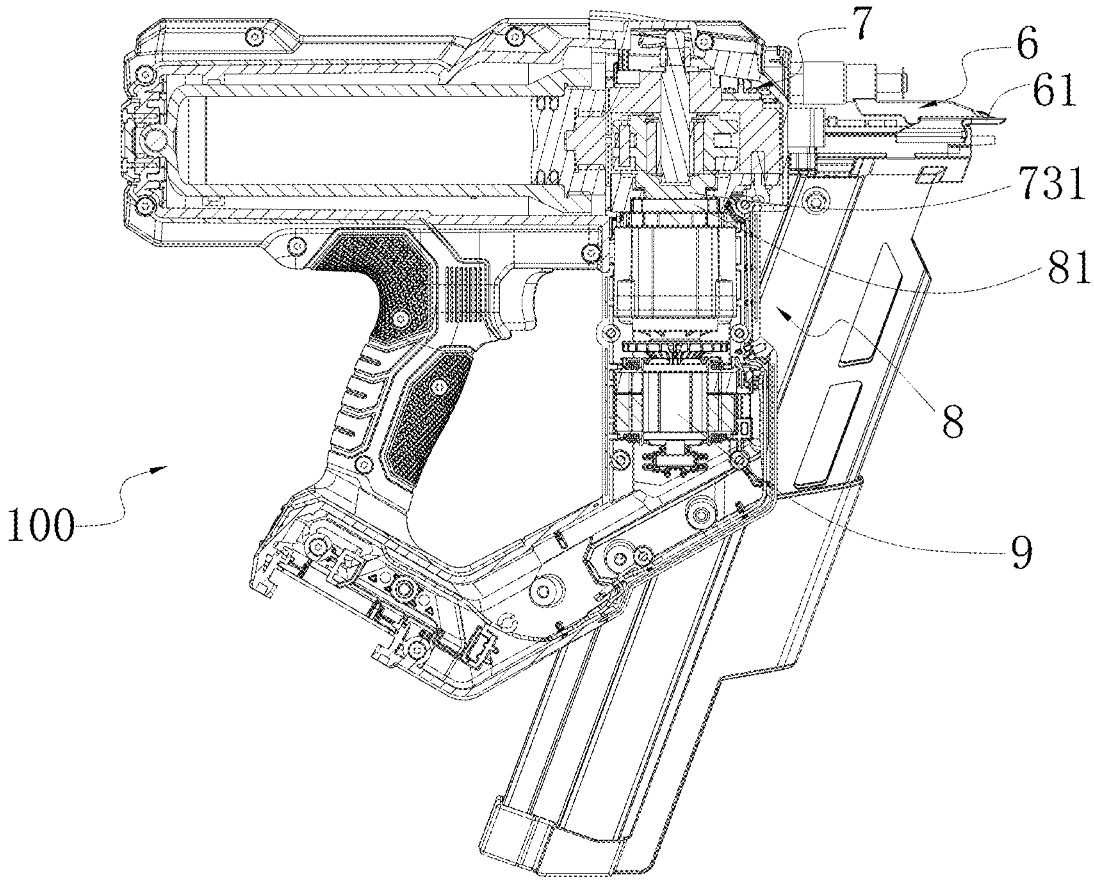
FIG. 15 is a sectional view of a fastener driver.
Figure 16:
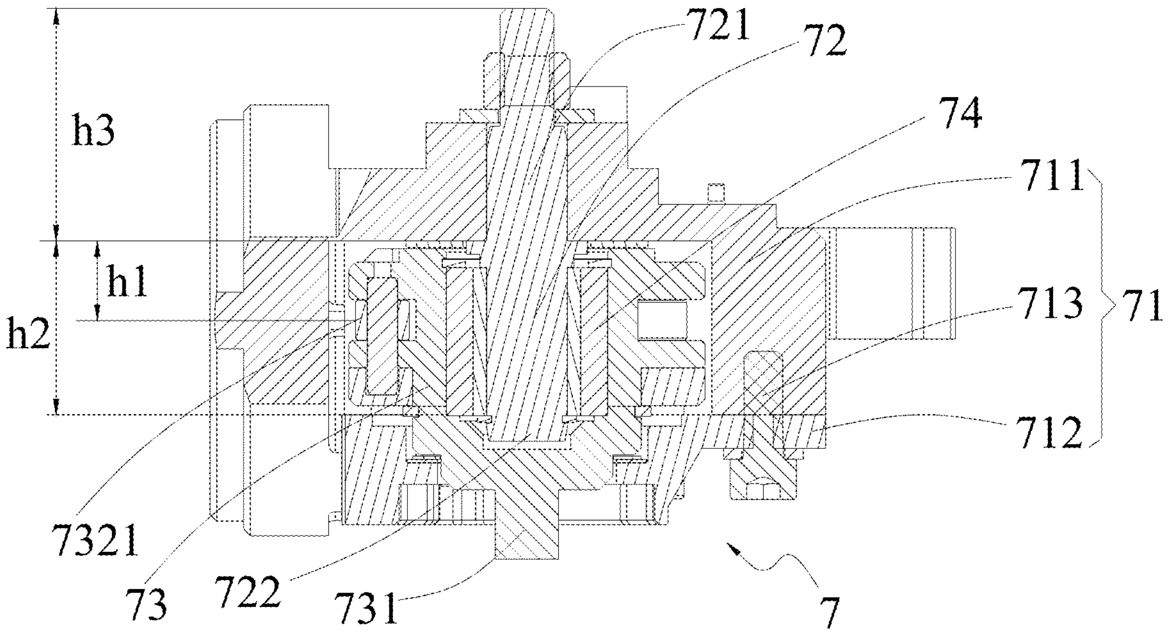
FIG. 16 is a sectional view of a drive assembly in a fastener driver.

As shown in FIGS. 15 and 16, the present application provides a fastener driver. The fastener driver 100 includes a striking assembly 6, a drive assembly 7, and an electric motor 9.

The striking assembly 6 includes a striking member 61 configured to strike a fastener. The drive assembly 7 is configured to drive the striking member 61, and the electric motor 9 outputs a driving force for driving at least the drive assembly 7. The drive assembly 7 includes a drive wheel 73, a transmission box 71, and a fixed shaft 72. The drive wheel 73 is configured to engage with the striking member 61 to drive the striking member 61 to move along the extension direction of the striking member 61. The transmission box 71 accommodates at least the drive wheel 73. The fixed shaft 72 is non-rotatably mounted onto the transmission box 71.

When the fastener driver 100 is working, the electric motor 9 drives the drive wheel 73 to rotate, and the drive wheel 73 drives the engaged striking member 61 to move along the extension direction of the striking member 61 to store energy and perform striking. Since the fixed shaft 72 is non-rotatably mounted onto the transmission box 71, the fixed shaft 72 is fixed relative to the transmission box 71. When the electric motor 9 drives the drive wheel 73 to rotate, the fixed shaft 72 is not bent, thereby avoiding the wobbles of the drive wheel 73 and ensuring effective engagement and transmission between the drive wheel 73 and the striking member 61. The service life of the drive wheel 73 and the striking member 61 can be extended, and the usage effect of the fastener driver 100 can be improved.

As shown in FIG. 16, in some examples, the fixed shaft 72 includes a first end 721 fixed to the transmission box 71 and a second end 722 for mounting the drive wheel 73. By fixedly mounting the first end 721 of the fixed shaft 72 onto the transmission box 71, the relative position of the fixed shaft 72 in the transmission box 71 can be limited, and the fixed shaft 72 can be prevented from moving relative to the body of the transmission box 71, thereby limiting the relative position between the drive wheel 73 mounted at the second end 722 of the fixed shaft 72 and the striking member 61, ensuring that the drive wheel 73 can effectively mate with the striking member 61, extending the service life of the drive wheel 73 and the striking member 61, and reducing the vibration of the fastener driver 100 in operation.

As shown in FIGS. 15 and 16, in some examples, the first end 721 is configured to be an end facing away from the electric motor 9, and the second end 722 is configured to be an end facing the electric motor 9. In the preceding manner, it is convenient to arrange the fixed shaft 72 in the transmission box 71, and the drive wheel 73 is disposed at the second end 722 facing the electric motor 9, thereby shortening the transmission chain between the electric motor 9 and the drive wheel 73 and facilitating the cooperation between the electric motor 9 and the drive wheel 73.

As shown in FIG. 16, in some examples, the transmission box 71 includes an upper cover 711 and a lower cover 712, and the first end 721 is fixed on the upper cover 711. By designing the transmission box 71 with the upper cover 711 and the lower cover 712, it is convenient to mount the fixed shaft 72 and the drive wheel 73 in the transmission box 71. The upper cover 711 and the lower cover 712 are connected via multiple bolts 713 so that the transmission box 71 can be easily assembled and disassembled.

As shown in FIG. 16, in some examples, the drive assembly 7 further includes a support bearing 74, where the support bearing 74 is configured to support the drive wheel 73. By providing the support bearing 74, friction can be reduced, thereby ensuring smooth rotation of the drive wheel 73.

As shown in FIG. 16, in some examples, the support bearing 74 is sleeved on the second end 722 of the fixed shaft 72. By providing the support bearing 74 between the second end 722 of the fixed shaft 72 and the drive wheel 73, the smoothness of the rotation of the drive wheel 73 relative to the fixed shaft 72 can be ensured. In other examples, a high-precision shaft sleeve may be fixedly disposed at the second end 722 of the fixed shaft 72, may also support the drive wheel 73, and can ensure smooth rotation of the drive wheel 73.

As shown in FIG. 16, in some examples, the support bearing 74 is accommodated in a wheel cavity of the drive wheel 73. In the preceding manner, the support bearing 74 can be used to effectively support the drive wheel 73, and the space occupied by the installation of the support bearing 74 can be reduced. The support bearing 74 may be a bearing with a larger axial length, or multiple bearings with a smaller axial length may be arranged at intervals in the wheel cavity of the drive wheel 73, and no further restrictions are imposed here.

As shown in FIG. 16, in some examples, the drive wheel 73 is disposed between the first end 721 of the fixed member and the lower cover 712. By arranging the drive wheel 73 in the transmission box 71, the compactness of the drive assembly 7 can be improved, thereby facilitating the arrangement of the drive assembly 7 on the fastener driver 100.

As shown in FIG. 16, in some examples, the center of a shaft pin 7321 of the drive wheel 73 is closer to the first end 721 of the fixed shaft 72 than the center of the support bearing 74. In the preceding manner, the strength of the connection between the first end 721 of the fixed shaft 72 and the upper cover 711 can be fully utilized. The first end 721 of the fixed shaft 72 is not easy to bend, thereby ensuring that the drive wheel 73 can rotate stably.

In some examples, the length h3 of the first end 721 is greater than or equal to 10 mm and less than or equal to 20 mm. By limiting the length range of the first end 721, the strength of the connection between the first end 721 of the fixed shaft 72 and the upper cover 711 can be ensured, and the upper cover 711 can be used to effectively support the first end 721, thereby avoiding the following: the first end 721 of the fixed shaft 72 is too long, causing the fixed shaft 72 to bend when the drive wheel 73 is subjected to a force.

In some examples, the fastener driver 100 further includes a transmission assembly 8, the transmission assembly 8 includes a drive shaft 81, and the drive wheel 73 is rotatably connected to the drive shaft 81. The transmission assembly 8 is disposed between the electric motor 9 and the drive wheel 73. The transmission assembly 8 is a gearbox and can play a role of reducing speed and increasing torque. The electric motor 9 drives the drive shaft 81 of the transmission assembly 8 to drive the drive wheel 73 to rotate, thereby ensuring that the drive wheel 73 effectively drives the striking member 61 to move.

In some examples, a flat portion 731 is fixedly disposed on the drive wheel 73 and is connectable to the drive shaft 81. The flat portion 731 is directly connected to the drive shaft 81, thereby facilitating installation, ensuring a compact structure, achieving the miniaturized design of the fastener driver 100, and facilitating the usage in a narrow space. The flat portion 731 and the drive wheel 73 are an integrated structure, thereby facilitating the manufacturing of the drive wheel 73 and ensuring the strength of the connection between the flat portion 731 and the drive wheel 73. In other examples, the flat portion 731 and the drive wheel 73 may be designed as split structures and connected and mounted by welding or screws, and no further restrictions are imposed here.

The present application further provides a fastener driver. The fastener driver 100 includes a striking assembly 6, a drive assembly 7, and an electric motor 9.

The striking assembly 6 includes a striking member 61 configured to strike a fastener, where the fastener is a nail. The drive assembly 7 is configured to drive the striking member 61, and the electric motor 9 outputs a driving force for driving at least the drive assembly 7. The drive assembly 7 includes a drive wheel 73, a support bearing 74, and a fixed shaft 72. The drive wheel 73 is configured to be capable of engaging with the striking member 61 to drive the striking member 61 to move along the extension direction of the striking member 61. The fixed shaft 72 is used for mounting the support bearing 74.

When the electric motor 9 drives the drive wheel 73 to rotate, the fixed shaft 72 and the support bearing 74 are used to support the drive wheel 73, thereby ensuring that the drive wheel 73 rotates smoothly relative to the fixed shaft 72, avoiding the generation of an angle of inclination between the drive wheel 73 and the striking member 61 during the long-term operation of the drive wheel 73, and ensuring the service life of the drive wheel 73 and the striking member 61.

The support bearing 74 and the drive wheel 73 at least partially overlap axially. In the preceding manner, the compactness after the drive wheel 73 and the support bearing 74 are mounted can be improved. Moreover, the drive wheel 73 can be supported by the support bearing 74 to ensure that the drive wheel 73 driven by the electric motor 9 rotates stably.

In some examples, the ratio at which the support bearing 74 and the drive wheel 73 overlap axially is basically greater than or equal to 0.5. The ratio at which the support bearing 74 and the drive wheel 73 overlap axially is a ratio of a length of a part of the support bearing 74 that overlaps the drive wheel 73 to a length of the support bearing 74. By limiting the ratio at which the support bearing 74 and the drive wheel 73 overlap, the drive wheel 73 and the support bearing 74 can overlap as much as possible, thereby further improving the compactness of the drive assembly 7 and enabling the support bearing 74 to support the drive wheel 73 more effectively.

In some examples, the drive assembly 7 further includes the transmission box 71, an end of the fixed shaft 72 is fixedly mounted onto the transmission box 71, and the other end of the fixed shaft 72 is accommodated in the transmission box 71. By providing the transmission box 71, the drive wheel 73 and the support bearing 74 located in the transmission box 71 can be protected. By fixedly mounting an end of the fixed shaft 72 onto the transmission box 71, the relative position of the fixed shaft 72 in the transmission box 71 can be limited, and the fixed shaft 72 can be prevented from moving relative to the transmission box 71, thereby limiting the relative position between the drive wheel 73 mounted on the fixed shaft 72 and the striking member 61, ensuring that the drive wheel 73 can effectively mate with the striking member 61, extending the service life of the drive wheel 73 and the striking member 61, and reducing the vibration of the fastener driver 100 in operation.

In some examples, the support bearing 74 is sleeved on the end of the fixed shaft 72 accommodated in the transmission box 71. In the preceding manner, after the drive wheel 73 is mounted, the smoothness of the rotation of the drive wheel 73 relative to the fixed shaft 72 can be ensured. Moreover, the drive wheel 73 is mounted at an end of the fixed shaft 72 facing the electric motor 9, thereby facilitating the transmission connection between the electric motor 9 and the drive wheel 73. In other examples, a high-precision shaft sleeve may be fixedly disposed at the second end 722 of the fixed shaft 72, may also support the drive wheel 73, and can ensure smooth rotation of the drive wheel 73.

The present application further provides a fastener driver, where the fastener driver 100 includes a striking assembly 6, a drive assembly 7, and an electric motor 9.

The striking assembly 6 includes a striking member 61 configured to strike a fastener. The drive assembly 7 is configured to drive the striking member 61, and the electric motor 9 outputs a driving force for driving at least the drive assembly 7. The drive assembly 7 includes a drive wheel 73 and a fixed shaft 72. The drive wheel 73 has multiple circumferentially arranged engagement positions, and the engagement positions can engage with the striking member 61 so that the striking member 61 is driven to move along the extension direction of the striking member 61. It is to be understood that multiple shaft pins are circumferentially arranged on the drive wheel 73, part of the shaft pin is embedded into the drive wheel 73, and part of the shaft pin is exposed outside the drive wheel 73 and can be seen. To protect the shaft pins exposed outside the drive wheel 73, pin sleeves may be sleeved on these shaft pins. In this case, the pin sleeves may be understood as the engagement positions that engage with the striking member 16. In some examples, if the pin sleeve is not provided on the circumference of the shaft pin, the portion of the shaft pin that is exposed outside the drive wheel 73 and can be seen is used as the engagement position. The fixed shaft 72 has the first end 721 for fixedly mounting the fixed shaft 72. In a direction parallel to the fixed shaft 72, the minimum distance h1 from the geometric center plane of the engagement positions to the first end 721 is greater than or equal to 3.5 mm. In the direction parallel to the fixed shaft 72, the minimum distance h1 from the geometric center plane of the engagement positions to the first end 721 may be 3.6 mm, 3.7 mm, 3.8 mm, . . . .

When the electric motor 9 drives the drive wheel 73 to rotate, the striking member 61 is driven to move along the extension direction of the striking member 61. Since the fixed shaft 72 has the first end 721, the fixed shaft 72 can be fixedly mounted onto the fastener driver 100 through the first end 721. By limiting the minimum distance h1 from the geometric center plane of the engagement positions to the first end 721, while it is ensured that the drive wheel 73 can be easily mounted on the fixed shaft 72, it is ensured that the drive wheel 73 is as close to the first end 721 of the fixed shaft 72 as possible, thereby fully utilizing the strength at the first end 721 of the fixed shaft 72, shortening the force arm from the geometric center plane of the engagement positions to the first end 721, improving the force-bearing condition of the fixed shaft 72 at the first end 721, ensuring that there is no angle of inclination between the drive wheel 73 and the striking member 61 caused by the bending of the fixed shaft 72, and ensuring the service life of the drive wheel 73 and the striking member 61.

In some examples, the drive assembly 7 further includes the transmission box 71, and the first end 721 of the fixed shaft 72 is fixedly mounted onto the transmission box 71. By providing the transmission box 71, the drive wheel 73 located in the transmission box 71 can be protected. By fixedly mounting an end of the fixed shaft 72 onto the transmission box 71, the relative position of the fixed shaft 72 in the transmission box 71 can be limited, and the fixed shaft 72 can be prevented from moving relative to the body of the transmission box 71, thereby limiting the relative position between the drive wheel 73 mounted on the fixed shaft 72 and the striking member 61, ensuring that the drive wheel 73 can effectively mate with the striking member 61, extending the service life of the drive wheel 73 and the striking member 61, and reducing the vibration of the fastener driver 100 in operation.

In some examples, the transmission box 71 includes the upper cover 711 and the lower cover 712, the first end 721 is fixed on the upper cover 711, and the drive wheel 73 is accommodated in the box body. By designing the transmission box 71 with the upper cover 711 and the lower cover 712, it is convenient to mount the fixed shaft 72 and the drive wheel 73 in the transmission box 71. The upper cover 711 and the lower cover 712 are connected via multiple bolts 713 so that the transmission box 71 can be easily assembled and disassembled. Moreover, the drive wheel 73 is located in the box body, thereby improving the integration degree of the transmission box 71.

In some examples, the minimum distance h2 from a lower end surface of the support bearing 74 to the first end 721 is greater than or equal to 10 mm. The minimum distance h2 from the lower end surface of the support bearing 74 to the first end 721 is 11 mm, 12 mm, 13 mm, 14 mm, . . . . Through the preceding limitations, the installation of the support bearing 74 can be guided. Moreover, while it is ensured that the drive wheel 73 can be easily mounted on the fixed shaft 72, it is ensured that the drive wheel 73 mounted on the support bearing 74 is as close to the first end 721 of the fixed shaft 72 as possible, thereby fully utilizing the strength at the first end 721 of the fixed shaft 72, shortening the force arm from the geometric center plane of the engagement positions to the first end 721, improving the force-bearing condition of the fixed shaft 72 at the first end 721, ensuring that there is no angle of inclination between the drive wheel 73 and the striking member 61 caused by the bending of the fixed shaft 72, and ensuring the service life of the drive wheel 73 and the striking member 61.

In some examples, h1 is less than or equal to h2. Through the preceding limitations, the center of a shaft pin 7321 of the drive wheel 73, that is, the position where the drive wheel 73 engages with the striking member, is closer to the first end 721 of the fixed shaft 72 than the center of the support bearing 74. Therefore, during the operation of the drive wheel 73, the force arm of the force acting on the first end 721 of the fixed shaft 72 by the drive wheel 73 is shortened, and the fixed shaft 72 is prevented from bending, thereby ensuring that there is no angle of inclination between the drive wheel 73 and the striking member 61 caused by the bending of the fixed shaft 72 and ensuring the service life of the drive wheel 73 and the striking member 61.

As shown in FIGS. 15 to 18, the present application provides a fastener driver 100. The fastener driver 100 includes a striking assembly 6, a drive assembly 7, and an electric motor 9.

The striking assembly 6 includes a striking member 61 configured to strike a fastener. The drive assembly 7 is configured to drive the striking member 61, and the electric motor 9 outputs a driving force for driving at least the drive assembly 7. The drive assembly 7 includes a drive wheel 73 configured to engage with the striking member 61 to drive the striking member 61 to move along the extension direction of the striking member 61, and the distance D from the centroid of the drive wheel 73 to a rotation axis 734 of the drive wheel 73 is less than or equal to 1.5 mm. For example, the distance D from the centroid of the drive wheel 73 to the rotation axis 734 of the drive wheel 73 may be 1.4 mm, 1.3 mm, 1.2 mm, 1.1 mm, . . . .

By limiting the distance from the centroid of the drive wheel 73 to the rotation axis 734 of the drive wheel 73, the centroid of the drive wheel 73 is made as close to the rotation axis 734 of the drive wheel 73 as possible so that the moment of inertia of the drive wheel 73 during rotation can be reduced, thereby reducing the impact on the service life of the bearing that supports the drive wheel 73 and the stability of the nail gun. Moreover, the regular wobbles of the fastener driver 100 can be reduced, thereby improving the user's operating feel.

Figure 17:
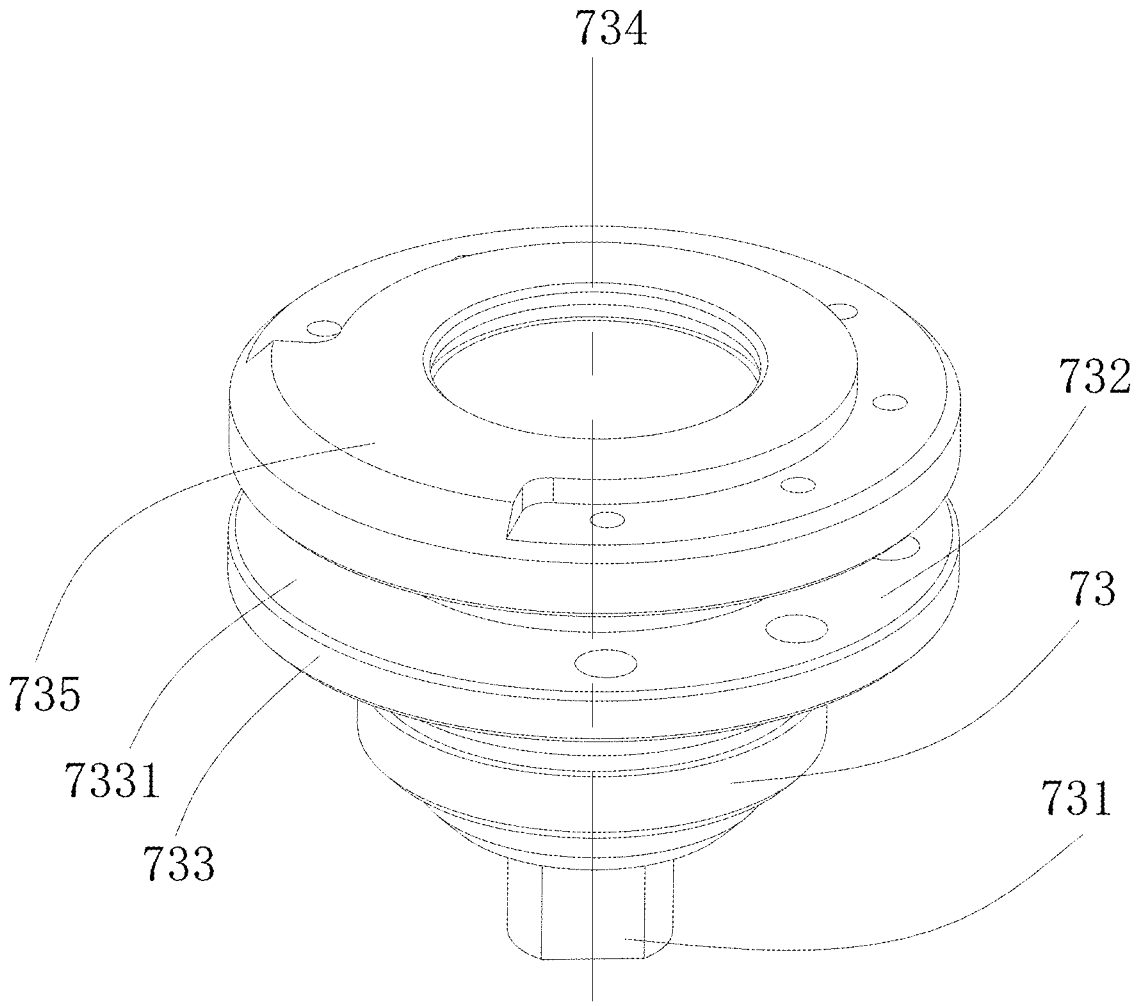
FIG. 17 is a schematic view of a drive wheel in a fastener driver.

As shown in FIGS. 16 and 17, in some examples, the drive wheel 73 is formed with a driving portion 732 and an avoidance portion 733 in the circumferential direction around the rotation axis 734. The driving portion 732 is provided with multiple shaft pins 7321 at uniform intervals. The shaft pins 7321 can engage with the striking member 61 to drive the striking member 61. The avoidance portion 733 has an avoidance position 7331 to disengage the drive wheel 73 from the striking member 61. The striking member 61 engages with the shaft pin. When the electric motor 9 drives the drive wheel 73 to rotate, the shaft pins 7321 located on the driving portion 732 engage with the striking member 61, thereby pushing the striking member 61 to store energy. When the drive wheel 73 rotates to the avoidance portion 733, the drive wheel 73 disengages from the striking member 61. The striking member 61 strikes the fastener. In the preceding manner, continuous nailing can be achieved and the structure is simple.

Figure 18:
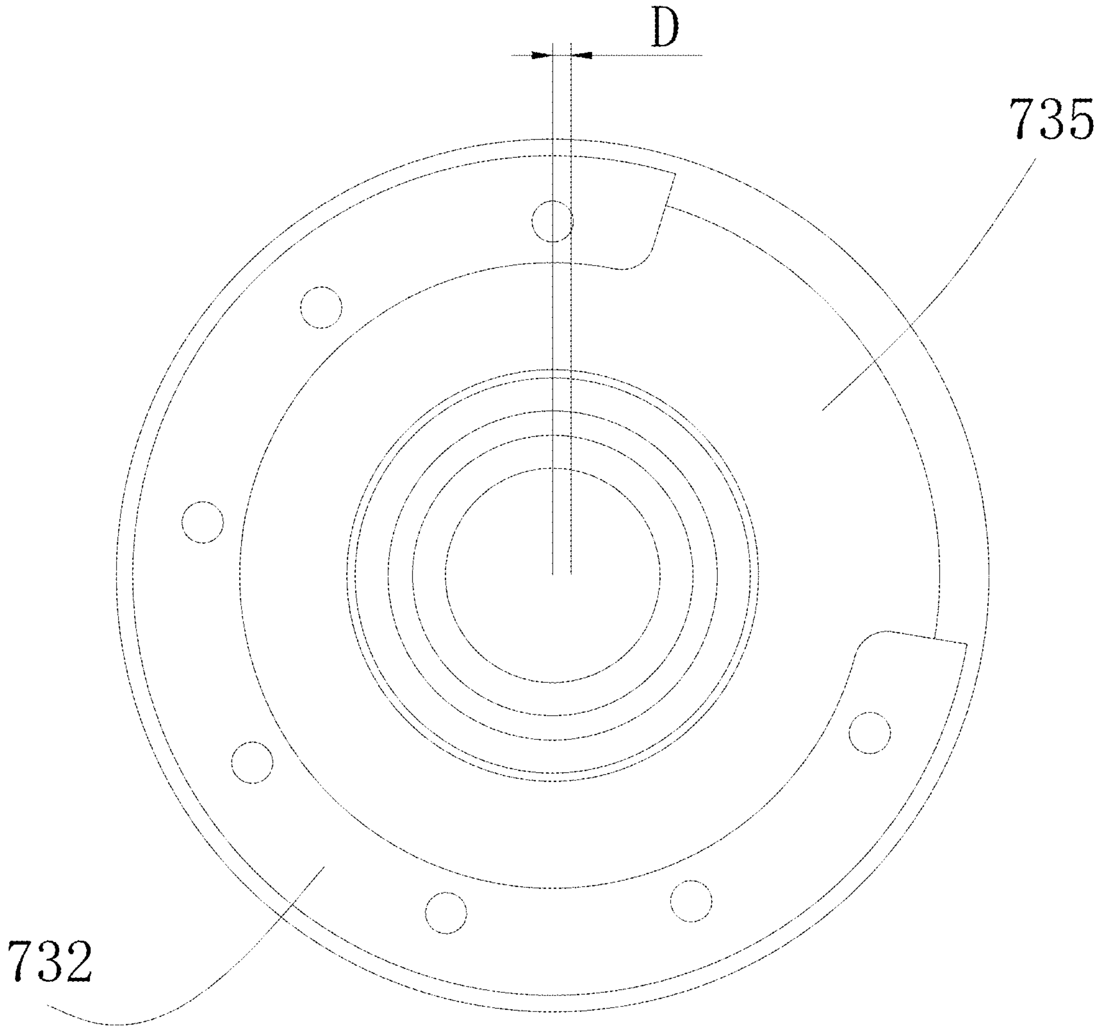
FIG. 18 is a top view of a drive wheel in a fastener driver.

As shown in FIGS. 17 and 18, in some examples, a counterweight 735 is disposed on the avoidance portion 733. By providing the counterweight 735 on the avoidance portion 733, the weight of the avoidance portion 733 is increased so that the weight of the avoidance portion 733 is approximately the same as the weight of the driving portion 732 provided with the multiple shaft pins 7321, thereby making the centroid of the drive wheel 73 as close to the rotation axis 734 of the drive wheel 73 as possible or making the centroid of the drive wheel 73 coincide with the rotation axis 734 of the drive wheel 73.

In some examples, the counterweight 735 is integrally formed with the body of the drive wheel 73. By designing the counterweight 735 and the body of the drive wheel 73 as an integrated structure, manufacturing is facilitated and the process of mounting the counterweight 735 on the body of the drive wheel 73 is omitted. Moreover, the strength of the connection between the counterweight 735 and the body of the drive wheel 73 is ensured, thereby preventing the counterweight 735 from being separated from the body of the drive wheel 73 due to the centrifugal force during the rotation of the drive wheel 73.

In some examples, the counterweight 735 is detachably mounted onto the avoidance portion 733. In the detachable mounting manner, the weight of the counterweight 735 can be changed according to actual requirements so that the distance between the centroid of the drive wheel 73 and the rotation axis 734 of the drive wheel 73 can be flexibly adjusted, thereby making the centroid of the drive wheel 73 as close to the rotation axis 734 of the drive wheel 73 as possible.

In some examples, the material for manufacturing the counterweight 735 is the same as the material of the body of the drive wheel 73. The same material is used to facilitate the manufacturing of the drive wheel 73.

In some examples, the weight of the drive wheel 73 is greater than or equal to 40 g. The weight of the drive wheel 73 may be 41 g, 42 g, 43 g, 44 g, . . . . By limiting the weight of the drive wheel 73, the weight does not increase too much after the counterweight is mounted on the body of the drive wheel 73. Moreover, although the drive wheel 73 has a greater weight than the half-moon-shaped drive wheel 73, the drive wheel 73 rotates more smoothly as a whole, thereby reducing the vibration of the fastener driver 100 caused by the rotation of the drive wheel 73 and making the operation more comfortable for the user.

As shown in FIGS. 15 to 18, the present application further provides a fastener driver 100, where the fastener driver 100 includes a striking assembly 6, a drive assembly 7, and an electric motor 9. The striking assembly 6 includes a striking member 61 configured to strike a fastener. The drive assembly 7 is configured to drive the striking member 61, and the electric motor 9 outputs a driving force for driving at least the drive assembly 7. The drive assembly 7 includes a counterweight 735 and a drive wheel 73. The drive wheel 73 is configured to be capable of engaging with the striking member 61 to drive the striking member 61 to move along the extension direction of the striking member 61. The counterweight 735 is capable of mating with the drive wheel 73 to balance the centroid deviation of the drive wheel 73.

By arranging the counterweight 735 on the drive wheel 73, the centroid of the drive wheel 73 is adjusted such that the centroid of the drive wheel 73 is as close to the rotation axis 734 of the drive wheel 73 as possible or the centroid of the drive wheel 73 coincides with the rotation axis 734 of the drive wheel 73. The moment of inertia of the drive wheel 73 during rotation can be reduced, thereby reducing the impact on the service life of the bearing that supports the drive wheel 73 and the stability of the nail gun. Moreover, the regular wobbles of the fastener driver 100 can be reduced, thereby improving the user's operating feel.

The basic principles, main features, and advantages of the present application are shown and described above. It is to be understood by those skilled in the art that the preceding examples do not limit the present application in any form, and any technical solutions obtained through equivalent substitutions or equivalent transformations are within the scope of the present application.

What is claimed is:

1. A fastener driver, comprising:

a striking assembly comprising a striking member configured to strike a fastener;

a drive assembly configured to drive the striking member and comprising a drive wheel configured to engage with the striking member to drive the striking member to move along an extension direction of the striking member, a transmission box accommodating at least the drive wheel, and a fixed shaft non-rotatably mounted onto the transmission box to support the drive wheel; and an electric motor providing a driving force for at least the drive assembly, wherein the fixed shaft comprises a first end fixed to the transmission box and a second end for mounting the drive wheel.

2. The fastener driver of claim 1, wherein the first end is configured to be an end facing away from the electric motor, and the second end is configured to be an end facing the electric motor.

3. The fastener driver of claim 1, wherein the transmission box comprises an upper cover and a lower cover, and the first end is fixed on the upper cover.

4. The fastener driver of claim 3, wherein the drive wheel is disposed between the first end and the lower cover.

5. The fastener driver of claim 1, wherein the drive assembly further comprises a support bearing, and the support bearing is configured to support the drive wheel.

6. The fastener driver of claim 5, wherein the support bearing is sleeved on the second end.

7. The fastener driver of claim 5, wherein the support bearing is accommodated in a wheel cavity of the drive wheel.

8. The fastener driver of claim 1, wherein a length of the first end is greater than or equal to 10 mm and less than or equal to 20 mm.

9. The fastener driver of claim 1, further comprising a transmission assembly, wherein the transmission assembly comprises a drive shaft, and the drive wheel is rotatably connected to the drive shaft.

10. The fastener driver of claim 9, wherein the drive wheel is provided with a flat portion connectable to the drive shaft.

11. A fastener driver, comprising:

a striking assembly comprising a striking member configured to strike a fastener;

a drive assembly configured to drive the striking member and comprising a drive wheel configured to engage with the striking member to drive the striking member to move along an extension direction of the striking member, a support bearing that at least partially overlaps axially with the drive wheel, and a fixed shaft for concentrically mounting the support bearing and the drive wheel; and an electric motor providing a driving force for at least the drive assembly.

12. The fastener driver of claim 11, wherein a ratio at which the support bearing and the drive wheel overlap axially is greater than or equal to 0.5.

13. The fastener driver of claim 11, further comprising a transmission box, wherein an end of the fixed shaft is fixedly mounted onto the transmission box, and another end of the fixed shaft is accommodated in the transmission box.

14. The fastener driver of claim 13, wherein the support bearing is sleeved on the end of the fixed shaft accommodated in the transmission box.

15. The fastener driver of claim 11, wherein the support bearing is accommodated in a wheel cavity of the drive wheel.

* * * * *